(12) United States Patent
Clemm et al.

(10) Patent No.: US 7,716,649 B2
(45) Date of Patent: May 11, 2010

(54) ACTIVITY-BASED SOFTWARE TRACEABILITY MANAGEMENT METHOD AND APPARATUS

(75) Inventors: Geoffrey M. Clemm, Concord, MA (US); Allan R. Tate, Bedford, MA (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 11/303,632

(22) Filed: Dec. 15, 2005

(65) Prior Publication Data

US 2007/0143735 A1 Jun. 21, 2007

(51) Int. Cl.
*G06F 9/44* (2006.01)
(52) U.S. Cl. .................. 717/128; 717/122; 717/127
(58) Field of Classification Search .......... 717/110, 717/127–128, 122
See application file for complete search history.

(56) References Cited

U.S. PATENT DOCUMENTS

| | | | |
|---|---|---|---|
| 5,278,979 A | 1/1994 | Foster et al. | |
| 5,574,898 A | 11/1996 | Leblang et al. | |
| 5,649,200 A | 7/1997 | Leblang et al. | |
| 5,701,472 A | 12/1997 | Koerber et al. | |
| 5,898,872 A | 4/1999 | Richley | |
| 6,112,024 A | 8/2000 | Almond et al. | |
| 6,385,768 B1 | 5/2002 | Ziebell | |
| 6,536,037 B1 | 3/2003 | Guheen et al. | |
| 6,698,013 B1 * | 2/2004 | Bertero et al. | 717/127 |
| 6,934,716 B2 * | 8/2005 | Bradley et al. | 707/103 R |
| 7,069,547 B2 * | 6/2006 | Glaser | 717/154 |
| 2003/0084425 A1 * | 5/2003 | Glaser | 717/110 |
| 2003/0120678 A1 | 6/2003 | Hill et al. | |
| 2003/0121024 A1 | 6/2003 | Hill et al. | |
| 2003/0204538 A1 | 10/2003 | Keene | |
| 2004/0268302 A1 | 12/2004 | Srivastava et al. | |
| 2005/0172306 A1 | 8/2005 | Agarwal et al. | |
| 2005/0210445 A1 * | 9/2005 | Gough et al. | 717/111 |

OTHER PUBLICATIONS

Chen, Y. et al., "Specification-based Regression Test Selection with Risk Analysis," *Proceedings of the 2002 Conference of the Centre for Advanced Studies on Collaborative Research*, Toronto, Canada (14 pp.).
Hayashi, K. et al., Temporally-threaded Workspace: A Model for Providing Activity-based Perspectives on Document Spaces, *Hypertext 98: Ninth ACM Conference on Hypertext and Hypermedia*, Pittsburgh, PA, Jun. 20-24, 1998 (pp. 87-96).

(Continued)

*Primary Examiner*—Wei Y Zhen
*Assistant Examiner*—Phillip H Nguyen
(74) *Attorney, Agent, or Firm*—Hamilton, Brook, Smith & Reynolds, P.C.

(57) ABSTRACT

Computer method and apparatus for managing traceability of a software program are disclosed. Given a subject software program, the invention method/apparatus provides a respective history log for each artifact of the program. The invention method/apparatus records in the respective history log changes made to an artifact of the subject software program. During a change being made to the artifact, a processor routine determines from the respective history log related artifacts. An indication of the determined related artifacts is displayed to a user as impact analysis results.

17 Claims, 4 Drawing Sheets

OTHER PUBLICATIONS

Estublier, J. et al., "Impact of the Research Community on the Field of Software Configuration Management, Summary of an Impact Project Report," *ACM SIGSOFT, Software Engineering Notes*, vol. 27, No. 5, Sep. 2002 (pp. 31-39).

Conradi, R. and B. Westfechtel, "Version Models for Software Configuration Management," *ACM Computing Surveys*, vol. 30, No. 2, Jun. 1998 (pp. 232-241).

Micallef, J. and G.M. Clemm, "The Asgard system: activity-based configuration management" in *Software Configuration Management, ICSE 96 SCM-6 Workshop*, Berlin, Germany, Mar. 25-26, 1996, Selected Papers, pp. 175-186.

Cohen, E.S. et al., "Version management in Gypsy," *SIGSOFT Software Engineering Notes*, vol. 13, No. 5, Nov. 1998 (pp. 201-215).

Conradi, R. and B. Westfechtel, "Version Models for Software Configuration Management," ACM Computing Surveys, vol. 30, No. 2, Jun. 1998 (pp. 232-282).

* cited by examiner

ACTIVITY-BASED SOFTWARE TRACEABILITY MANAGEMENT METHOD AND APPARATUS

BACKGROUND OF THE INVENTION

Software development is typically performed as group projects. A subject software system is developed through design efforts, test efforts, implementation efforts and maintenance efforts. There may be different groups and different group members participating in each of these efforts. Throughout these efforts and among the work group members, various modeling and other development tools are used for increased communication and consistency in developing the subject software system. A software traceability management system is one such tool.

When a software development artifact is modified, the developer would like to know what other artifacts need to be modified in order for the subject system to remain consistent. An "artifact" is the persistent result of work done by a user, typically persisted in a file system such as a model and source code. Being able to perform impact analysis before changing an artifact has been a longstanding (but elusive) need in software development for years. One of the main issues is managing change to software/system requirements. Without the ability to perform impact analysis, artifacts produced as part of the development process drift apart and become inconsistent. This leads to misunderstandings, wasted time, schedule slips and non-conformance to requirements. In short, failure to manage change leads to higher development costs.

For example, when two software artifacts are connected by a dependency traceability relationship, a change to the first artifact might require a change to the second artifact in order to maintain the semantics of that relationship. These dependence traceability relationships are an essential mechanism for determining impact analysis, i.e., determining what other artifacts need to be updated following a change to a given set of artifacts.

Traditional solutions attempt to solve the problem using manually created and maintained traceability links. Links are manual because the variety of artifact types spans domains: for example, requirements are human readable while code is written in a formal technical language. Complex software systems have hundreds, if not thousands of requirements, and there are many to many relationships between artifact types: requirements, needs, designs, tests, code, etc.

Past attempts to create and maintain the traceability relationships fail because the cost to the development team outweighs the benefit. Maintaining traceability links is an arduous task even for a relatively small development effort and this is one of the main reasons existing traceability solutions fail. There are many accounts that document this issue and the difficulty in solving it.

SUMMARY OF THE INVENTION

The present invention addresses the problems of the prior art and provides activity based traceability management. A traceability management system of the present invention includes computer implemented steps of:
given a subject software program, providing a respective history log for each artifact of the program;
recording in the respective history log changes made at the same time to a set of artifacts of the subject software program;
during a change being made to the artifact, determining from the respective history log related artifacts; and
displaying an indication of the determined related artifacts as impact analysis results.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1A:
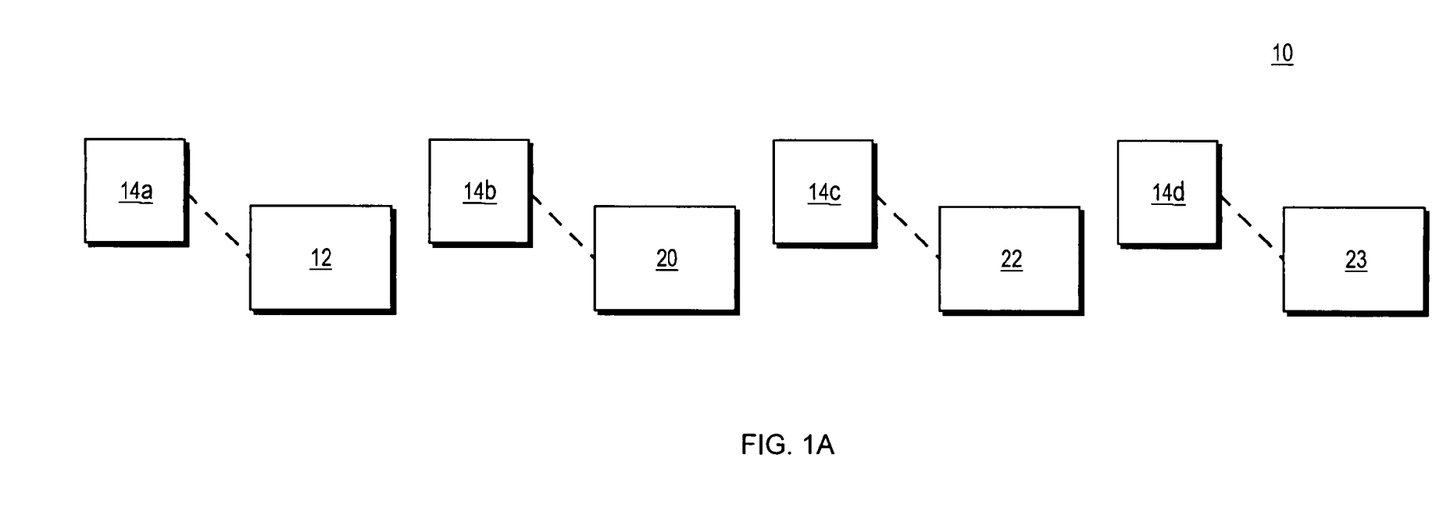
FIGS. 1a-1b are block diagrams of one embodiment of the present invention.
Figure 1B:
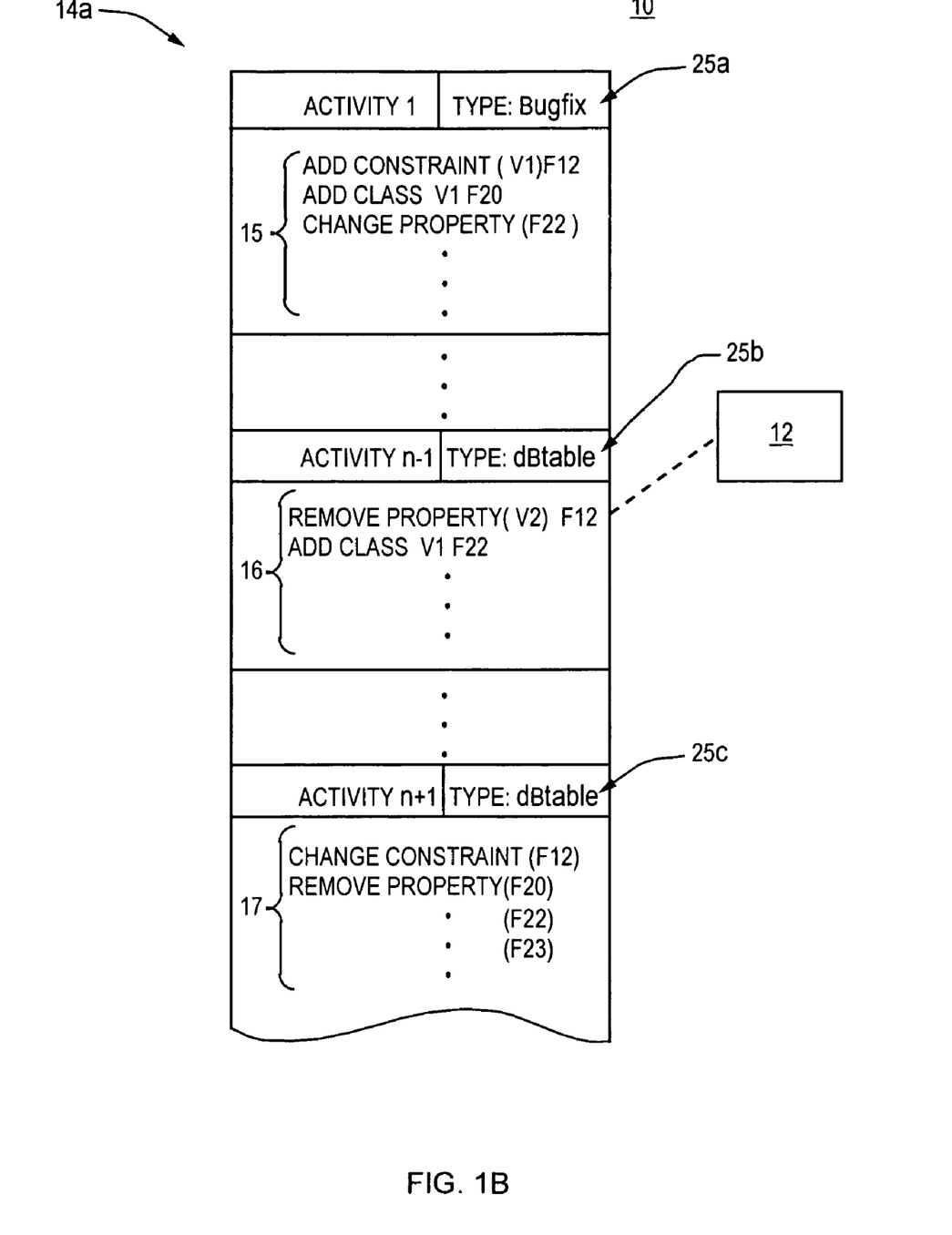

With reference to FIGS. 1a and 1b, the present invention provides a traceability management tool (system) 10 which is activity based. The tool 10 provides a respective history log or change history 14 for each of various work files (artifacts) 12, 20, 22, 23. Each change history 14 indicates a series or sets of changes made to respective artifact (file) 12, 20, 22, 23. Here all changes are made in the context of an "activity" where the set of all changes to complete an activity is known as a "change set" 15, 16, 17. Each change set indicates changes and respective artifacts operated on by the changes. FIG. 1b is illustrative.

FIG. 1b illustrates the change history 14a of artifact 12. Change histories 14 of the other files (artifacts) 20, 22, 23 are similar in concept. A first activity (Activity 1) is formed of change set 15. Changes included in change set 15 are indicted as having modified files 12, 20 and 22.

A later Activity n−1 is recorded as including changes to file 12 (version 2 for example) and file 22 in its change set 16. Similarly Activity n+1 is recorded by tool 10 as having changes (change set 17) that modified files 12, 20, 22 and 23.

In addition, change history 14a records the respective type or kind (category) 25 of activity defined by change sets 15, 16, 17. For example, Activity 1 is illustrated as being a bug fix 25a and Activity n−1 and Activity n+1 are database table changes 25b,c. Other activity types 25 include enhancements, changes to the G UI (graphical user interface) and the like.

In one embodiment, change history 14a, b, c, d of an artifact 12, 20, 22, 23 is implemented as a linked list of records. Each record corresponds to a respective activity and holds information and data representing changes (change sets 15, 16, 17) of that activity. Through a pointer, reference, identifier or other common technique, the change history 14a, b, c, d is associated with or loosely coupled to respective artifact 12, 20, 22, 23. That way, with each modification of artifact 12, a respective activity record is made in (e.g., appended to) change history 14a. As such, change history 14a effectively serves as a history log of artifact 12.

Other data structures for implementing change history 14, change sets 15, 16, 17 and activities are suitable and in the purview of one skilled in the art.

Referring back to FIG. 1a, when a software artifact 12 is modified, a history log or change history 14a of that artifact is inspected, and all files that are the products of a change set 15, 16, 17 that modified that artifact 12 are identified as objects that might need to be modified. Thus, the present invention leverages information that is made available (via the change history 14), and the user follows an activity based usage model.

By contrast to the prior art, the present invention builds upon activity based change management. Unlike traditional methods of providing impact analysis, the present invention does not burden the development team with the arduous task of creating and maintaining traceability links. Rather, the present invention infers dependency relationships from the change history 14 that the traceability management system 10 records from normal day-to-day usage.

In the illustrated example of FIG. 1b the preferred embodiment 10 determines an ordered list of related files to artifact 12 as follows. When artifact 12 is modified, tool 10 refers to respective change history 14a. On a per activity/change set 15, 16, 17 basis, tool 10 counts the respective occurrences of other files, 20, 22, 23 indicated in each change set 15, 16, 17. Tool 10 determines the file 20, 22, 23 with the greatest number of occurrences (i.e., highest relative frequency of occurrence) to be most likely a related file of subject artifact 12. Likewise tool 10 determines the file with the second greatest number of occurrences in change sets 15, 16, 17 to be the next likely related file of subject artifact 12 and so on.

In the illustrated example, tool 10 determines that file 22 has been affected (changed) more often with the changes to given artifact 12 than any other file. That is, file 22 is indicated in each of change sets 15, 16 and 17 while file 20 is indicated only in two change sets 15, 17. Thus tool 10 outputs an ordered list indicating a high probability of file 22 being related to given artifact 12 and a somewhat lower probability of file 20 being related to given artifact 12.

In other embodiments, the determination of related files to artifact 12 is made based on change sets of activities of the same activity type 25. So in the illustrated example of FIG. 1b, say artifact 12 is currently modified by an activity of the type 25 indicated "database table change". Invention tool 10 then filters (i.e., only considers) the change history 14a activity entries of type "database table change" 25b, 25c. This results in tool 10 analyzing only Activity n−1 and Activity n+1 or respective change sets 16, 17 to determine files that have most frequently been affected by changes to given artifact 12. Based on the illustrated change sets 16, 17, tool 10 determines changes to file 22 are recorded in each of these subject activities and outputs an indication that file 22 is a related file to give artifact 12. Tool 10 finds files 20 and 23 indicated in only change set 17 and thus indicated relatively fewer times than file 22 with respect to the subject change sets 16, 17. As such tool 10 outputs an ordered list indicating files 20 and 23 after file 22 as the determined related files to given artifact 12.

In another embodiment, tool 10 gives higher weight to more recent change sets. So if the first ten change sets in change history 14a of the given artifact 12 indicate file 20 as having been affected but the most recent change sets indicate file 23 as having been changed with the changes to given artifact 12, then tool 10 gives higher weight to file 23 based on recent frequency. However, in the case of a tie based on recency/change set 15, 16, 17 age, then tool 10 places priority on activity type 25 (discussed above).

Other combinations or permutations of weighting and ordering lists of related files are suitable and in the purview of are skilled in the art given this disclosure the present invention.

Pseudo code for traceability management system 10 is as follows:

For each activity:
record changes (operation, artifact-file) in respective artifact change history 14;
form subject change set from recorded changes;
For a current modification to given artifact 12:
read change history 14a of given artifact;
determine files produced by change sets 15, 16, 17 in change history 14a;
identify these files as candidate objects and order list of files
weight files frequently changed higher than files less frequently changed in change sets 15, 16, 17
consider files of only change sets 15, 16, 17 of activity type 25 similar to activity type of current modification to given artifact 12;
weight files with recent frequency of change
Based on weighting/order, define related files (artifacts);
Display indication of defined related files (artifacts) to user as results of an impact analysis.

Figure 2:
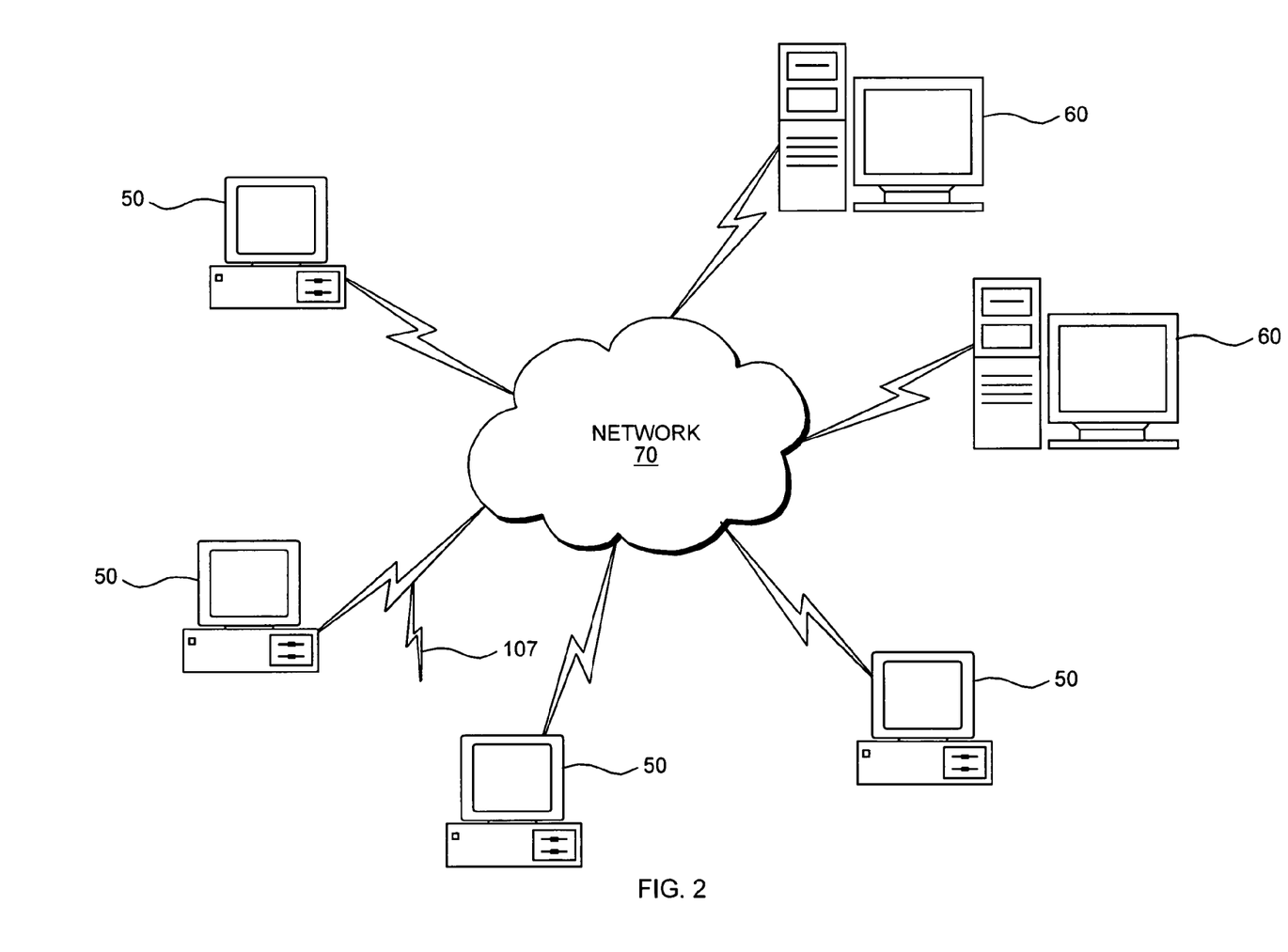
FIG. 2 is a schematic view of a computer network environment in which embodiments of the present invention operate.

FIG. 2 illustrates a computer network or similar digital processing environment in which the present invention may be implemented.

Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 3:
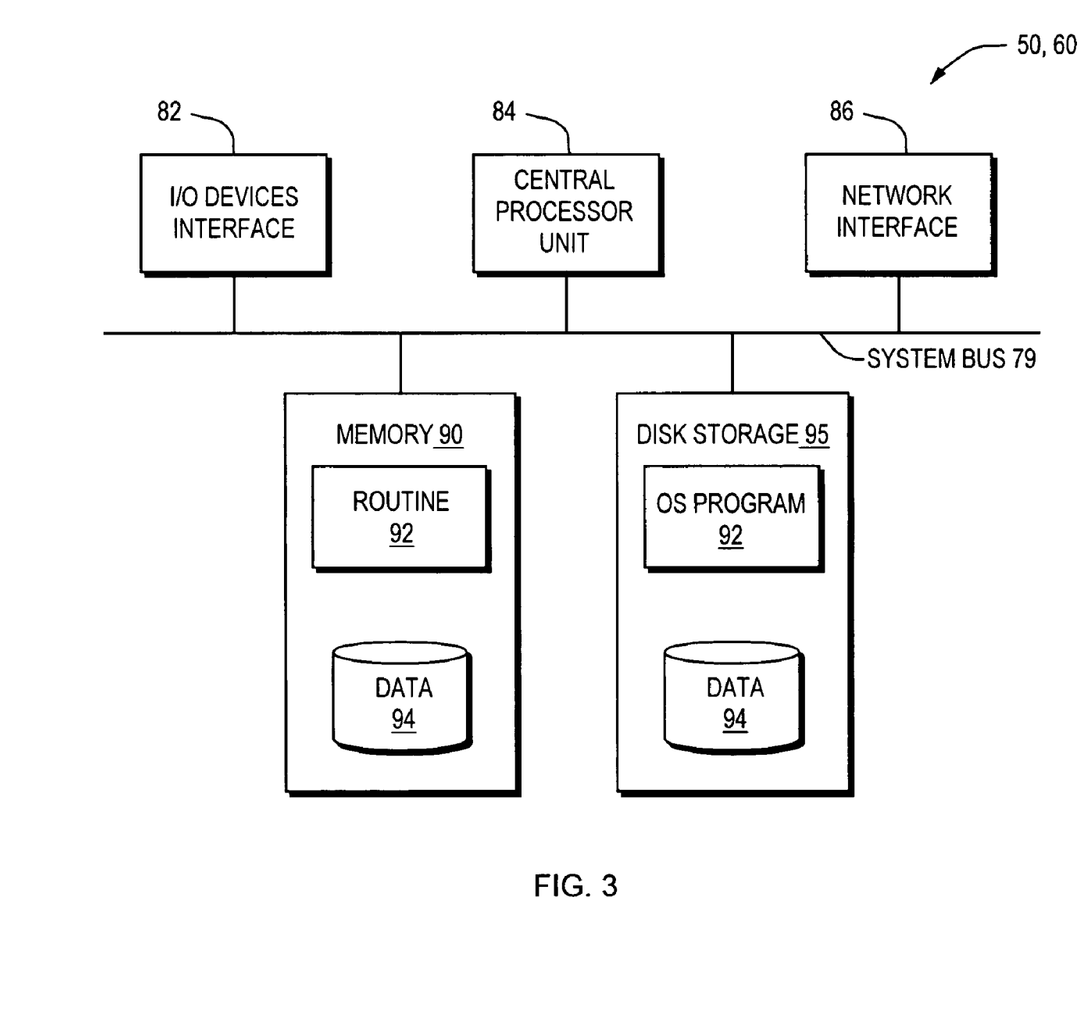
FIG. 3 is a block diagram of a computer node in the network of FIG. 2.

FIG. 3 is a diagram of the internal structure of a computer (e.g., client processor/device 50 or server computers 60) in the computer system of FIG. 2. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 2). Memory 90 provides volatile storage for computer software instructions 92 and data 94 used to implement an embodiment of the present invention (e.g., activity based traceability management system 10 and change history 14 detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While this invention has been particularly shown and described with references to preferred embodiments thereof, it will be understood by those skilled in the art that various changes in form and details may be made therein without departing from the scope of the invention encompassed by the appended claims.

For example, the computer network and system of FIGS. 2 and 3 are for purposes of illustration and not limitation. Other computer architecture and configurations are suitable.

Further, change history 14 and change sets 15, 16, 17 may be implemented in a variety of data structures, objects and other techniques common in the art. The foregoing describes one such implementation for purposes of illustration and not limitation.

Traceability management tools and methods 10 of the present invention may be incorporated into or a feature of a configuration management system. When a change is made to one file in a configuration of a software program, the present invention tool/method 10 determines what other files are related to the one file. This automated determination of traceability (relationship) information enables a programmer-user to perform impact analysis during the configuring of the subject software program.

What is claimed is:

1. A method of managing traceability information of a software program, comprising the computer implemented steps of:
   given a subject software program, providing a respective history log for each artifact of the program;
   recording in the respective history log sets of changes made to an artifact of the subject software program, each set of changes indicating and producing respective files, and each set of changes being for a respective activity indicative of user usage, different sets indicating different user's usage of the artifact, wherein the respective history log holds (i) indications of activities and (ii) per activity, indications of a responding set of changes;
   during a change being made to the artifact, determining from the respective history log which files are relatively more related to which artifacts, including referring to the respective history log and on a per activity, per change set basis counting respective occurrences of other files indicated in each change set, the file with the greatest number of occurrences being determined to be a most likely related file of the artifact, and the file with the second greatest number of occurrences being determined to be a next likely related file of the artifact, such that artifact dependency relationships are inferred from the activities recorded and from the activities as recorded being indicative of day to day usage by users, said determining resulting in determined-by-inference-to-be-related artifacts; and
   providing activity based change management by displaying an indication of the determined-by-inference-to-be-related artifacts as impact analysis results, including outputting an ordered list indicating the files from highest to lowest relative frequency of occurrences as being highest probable to lowest probable files being related to the artifact, the file determined to be the most likely related file being listed first.

2. A method as claimed in claim 1 wherein the step of determining includes weighting files produced in one set of changes over files produced in another set of changes.

3. A method as claimed in claim 1 wherein the step of determining includes biasly weighting files that are subjects of changes of activities similar to activity associated with the change being made to the artifact.

4. A method as claimed in claim 1 further comprising the step of:
enabling user definition of a related artifact.

5. A method as claimed in claim 4 wherein the step of enabling user definition includes displaying meta data of changes recorded in the history log.

6. Computer apparatus for managing software traceability information, comprising:
one or more records holding, for each artifact of a subject software system, a respective history log of sets of changes made to the artifact, each set of changes indicating and producing files, and each set of changes being for a respective activity indicative of user usage, different sets indicating different user's usage of the artifact, wherein the respective history log includes (i) indications of activities, and (ii) per activity, indications of a change set forming the activity; and
a computer processor coupled to access the one or more records and configured to determine from the respective history log a set of related artifacts to a change being made to the artifact including determining which files are relatively more related to which artifacts, said determining being by referring to the respective history log and on a per activity, per change set basis counting respective occurrences of other files indicated in each change set, the file with the greatest number of occurrences being determined to be a most likely related file of the artifact, and the file with the second greatest number of occurrences being determined to be a next likely related file of the artifact, such that artifact dependency relationships are inferred from the activities recorded from the activities recorded being and indicative of day to day usage by users, the computer processor indicating therefrom a determined-by-interface set of related artifacts and enabling activity based change management by displaying to a user the determined-by-inference set of related artifacts as results of an impact analysis, the displaying including an ordered list indicating the files from highest to lowest relative frequency of occurrences as being highest probable to lowest probable files being related to the artifact, the file determined to be the most likely related file being listed first.

7. Apparatus as claimed in claim 6 wherein the computer processor further weights files produced in one set of changes over files produced in another set of changes.

8. Apparatus as claimed in claim 6 wherein the computer processor further biasly weights files that are subjects of changes of activities similar to activity associated with the change being made to the artifact.

9. Apparatus as claimed in claim 6 wherein the computer processor further enables user definition of a related artifact.

10. Apparatus as claimed in claim 9 wherein the computer processor displays to a user meta data of changes recorded in the history log to enable user-definition of a related artifact.

11. A software traceability management system comprising:
a log indicating respective history of sets of changes made to each artifact of a subject software program, each set of changes indicating and producing respectively history log files, and each set of changes being for a respective activity indicative of user usage, different sets indicating different user's usage of the artifact, wherein for the respective history log, the log indicates (i) activities and (ii) per activity, a change set forming the activity;
during a change being made to the artifact, a processor determining which files are relatively more related to which artifacts based on the log means indicated respective history, including the computer tool on a per activity, per change set basis counting respective occurrences of other files indicated in each change set, the file with the greatest number of occurrences being determined to be a most likely related file of the artifact, and the file with the second greatest number of occurrences being determined to be a next likely related file of the artifact, such that artifact dependency relationships are inferred from the activities recorded and from activities recorded being indicative of day to day usage by users, the computer tool indicating related artifacts determined by inference; and
an output member means coupled for communication with the computer tool, the output member means rendering to a user an indication of the related artifacts determined artifacts by inference as impact analysis results and enabling activity-based change management, the output member including outputting an ordered list indicating the files from highest to lowest relative frequency of occurrences as being highest probable to lowest probable files being related to the artifact, the file determined to be the most likely related file being listed first.

12. A system as claimed in claim 11 wherein the computer tool weights files produced in one set of changes over files produced in another set of changes.

13. A system as claimed in claim 11 wherein the computer tool relatively heavily weights files that are subjects of changes of activities similar to activity associated with the change being made to the artifact.

14. A system as claimed in claim 11 wherein the computer tool further enables user definition of a related artifact.

15. A system as claimed in claim 14 wherein the computer tool displays to a user meta data of changes recorded in the log to enable user definition of a related artifact.

16. A computer program product comprising:
a computer readable storage medium having computer usable program code for activity based software traceability management, said program code including:
computer usable program code for providing a respective history log for each artifact of the program;
computer usable program code for recording in the respective history log sets of changes made to an artifact of the subject software program, each set of changes indicating and producing respective files, and each set of changes being for a respective activity indicative of user usage, different sets indicating different user's usage of the artifact, wherein the respective history log holds (i) indications of activities and (ii) per activity, indications of a corresponding set of changes;
computer useable program code for determining by inference from the respective history log related artifacts during a change being made to the artifact, including determining which files are relatively more related to which artifacts by referring to the respective history log and on a per activity, per change set, the file with the greatest number of occurrences being determined to be a most likely related file of the artifact, and the file with the second greatest number of occurrences being determined to be a next likely related file of the artifact, such that artifact dependency relationships are inferred from the activities recorded and from the activities recorded being indicative of day to day usage by users; and computer usable program code for displaying an indication of the determined related artifacts as impact analysis results and enabling activity based change management, the code for displaying including code for outputting an ordered list indicating the files from highest to lowest relative frequency of occurrences as being highest probable to lowest probable files being related to the artifact.

17. A computer program product as claimed in claim 16 further comprising computer usable program code for weighting files produced in one set of changes over files produced in another set of changes.

* * * * *